US007024395B1

(12) United States Patent
McCown et al.

(10) Patent No.: US 7,024,395 B1
(45) Date of Patent: Apr. 4, 2006

(54) METHOD AND SYSTEM FOR SECURE CREDIT CARD TRANSACTIONS

(75) Inventors: Steven H. McCown, Brighton, CO (US); James P. Hughes, Lino Lakes, MN (US); Michael L. Leonhardt, Longmont, CO (US); Charles A. Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 993 days.

(21) Appl. No.: 09/598,777

(22) Filed: Jun. 16, 2000

(51) Int. Cl.
*G06F 17/60* (2006.01)

(52) U.S. Cl. .............................. 705/65; 705/1; 705/14; 705/16; 705/17; 705/26; 705/35; 705/38; 705/39; 705/40; 705/41; 705/42; 705/64; 705/75; 705/76; 705/77; 705/67; 235/375; 235/379; 235/380; 235/381; 235/487; 235/492; 235/493; 709/203; 709/227; 709/228; 380/255; 713/168

(58) Field of Classification Search .................. 705/64, 705/67, 71, 1, 14–17, 26, 35, 38–42, 65, 705/75–77; 235/375, 487, 379–381, 492, 235/493; 709/203, 227, 228; 380/225; 713/168
See application file for complete search history.

(56) References Cited

U.S. PATENT DOCUMENTS 5,317,636 A * 5/1994 Vizcaino ...................... 380/23
5,530,232 A * 6/1996 Taylor ........................ 235/380
5,850,442 A * 12/1998 Muftic ........................ 380/21
5,850,446 A * 12/1998 Berger et al. ................. 380/24
5,931,917 A * 8/1999 Nguyen et al. ............. 709/250
6,199,052 B1 3/2001 Mitty et al.
6,205,437 B1 3/2001 Gifford

FOREIGN PATENT DOCUMENTS

WO WO 99 57835 A 11/1999

OTHER PUBLICATIONS

Rankl, W. and Effing, W. Smart Card Handbook (c) 1997. Johgn Wiley and Sons, Inc. Chichester. pp. 83-89.*

* cited by examiner

*Primary Examiner*—James A Reagan
(74) *Attorney, Agent, or Firm*—Yee & Associates, P.C.

(57) ABSTRACT

A customer making a credit card transaction inserts their smart card into a card reader attached to the merchant's system. The card reader activates the customer's card and passes certain merchant information. The merchant's system then requests a "billing digest" from the customer's card. The billing digest is returned to the merchant's card reader that forwards it (and the transaction information which includes customer information and merchant information) to the corresponding credit card issuer, which maintains the customer's credit card account. In one embodiment, the customer information and the merchant information are encrypted. Upon receiving the billing digest, transaction information is decrypted if necessary and the credit card issuer looks up the customer's master key using the customer's account number. The credit card issuer then uses the transaction information to re-compute the billing digest (an authentication billing digest) and compares this new value with the billing digest submitted by the merchant. If authentic, the billing digest and authentication billing digest values are equivalent, then funds are transferred and an acceptance notification is returned to the merchant. If not authentic, a denial notification is returned to the merchant. Security is further enhanced by utilizing a unique reference for each transaction in the unique customer information used for creating the billing digest.

27 Claims, 11 Drawing Sheets

METHOD AND SYSTEM FOR SECURE CREDIT CARD TRANSACTIONS

BACKGROUND OF THE INVENTION

1. Technical Field

The present invention relates generally to an improved data processing system and in particular to a method and apparatus for managing data within a data processing system. More particularly, The present invention relates to the field of encryption technology. Still more particularly, the present invention relates to encryption key management for securing credit and debit card transactions.

2. Description of Related Art

For years now, credit and debit cards have proven to be an efficient and convenient transaction medium for consumer to business transactions. Consumers have grown to rely heavily on these cards as a transaction medium in lieu of currency especially when carrying large sums of currency is either impractical or unsafe. Travelers have long understood the benefits for using credit and debit cards as currency for their convenience and security over physical currency.

Some consumer transactions do not lend themselves well to physical currency, bank checks or bank drafts. It is difficult or impossible to conduct real time consumer transactions for tele-commerce businesses, e-commerce businesses and certain vending business applications using currency or checks. Merchants necessarily require a means for instantaneously debiting a valid consumer account prior to completing the transaction. On the other hand, consumers require real time responses from merchants and do not want to be troubled by carrying large sums of currency. Both the consumers and merchants suffer when currency, checks or other drafts are lost during transportation from the consumer to the merchant. Thus, many consumer/merchant transactions rely on credit and debit cards for completing the transaction.

However, in many instances losses resulting from theft and fraud of credit and debit cards or their account information, are not recovered but rather shifted from the consumer and/or merchant to a financial institution that issued the card. Thus, while the consumer/merchant transactions seem more secure and less prone to fraud and theft, many times the losses are only transparent to the consumer and merchant utilizing credit and debit card technologies. In fact, the entire traditional and e-commerce markets are plagued with fraud and security holes that cannot be overcome by current tools and applications designed to tighten security around credit and debit cards. Examples of fraud range from stealing physical cards, card numbers, or forging signatures to intercepting critical data related to the card.

A typical example of credit card fraud involves a cashier ‘swiping’ a customer’s card in a valid card reader and then re-swiping the card in a clandestine card reader. By the time that issuing financial institutes realize that the card numbers are being used for illegal transactions, several thousand card numbers may have been stolen. Tracking the source of such an operation is difficult, moreover identifying which cards used at the location that have been compromised is virtually impossible because of the extreme volume of financial institutions issuing credit cards.

Another example of fraud involves e-commerce transactions. e-commerce facilities are not always secure from hackers. A hacker may attack the merchant’s server, proxy or website to gain credit card information. Once a facility is compromised, credit card numbers can be used by the hacker or others for fraudulent transactions. In one recent case, a website was compromised and numerous credit card numbers were posted on a public website. This required the financial institutions that issued the credit cards to invalidate those card numbers, stop/verify pending transactions, and issue new card numbers to their account holders.

Although not fraud per se, another credit card related concern is the potential for privacy violations. One type of such violation is the practice of “customer profiling”. Customer profiling is a means for identifying potential new customers based upon predicting individual’s future buying habits. These habits are developed into a “customer profile” by collecting and analyzing records of the customer’s past credit card transactions. Customer profilers create such customer profiles and make the information available to merchants. The targeted customers may be subject to bombardment with junk mail circulars, telephone solicitation, unsolicited e-mail or the like.

The current customer-merchant-bank methodology lends itself to theft or misuse of credit card information. Therefore, it would be advantageous to reduce the ease at which credit and debit cards and their information is misappropriated or misused.

SUMMARY OF THE INVENTION

The present invention provides a method and apparatus for securing credit and debit card transactions. The present invention employs a smart card as a credit card and contains memory and a microprocessor. A customer making a credit card transaction inserts their credit card into a card reader attached to the merchant’s system e.g. cash register billing computer or the like. The card reader activates the customer’s card and passes certain merchant information. After inputting the information, the merchant’s system asks the customer’s card for a “billing digest”. The billing digest is the result of a hashing function within the card operating upon the merchant information and the customer information (in combination the merchant information and customer information is referred to as transaction information). The merchant information, including merchant identification number, merchant name, transaction type, amount, time/date, etc. while the customer information may include the customer’s account number, name, etc. (the customer’s master key is not transmitted to the merchant or the credit card issuer). The billing digest is returned to the merchant’s card reader that forwards it (and the transaction information) to the corresponding credit card agency or issuer, which maintains the customer’s credit card account. In one embodiment, the transaction information is encrypted. The credit card issuer decrypts the information, if necessary, and looks up the customer’s master key using the customer’s account number from the customer information. The credit card issuer then uses the information, including the customer’s master key from the customer information, to verify the customer, merchant and transaction information by re-computing the billing digest and comparing this new value with the billing digest submitted by the merchant. This re-computed billing digest is termed an “authentication billing digest”. If the billing digest and authentication billing digest values are equivalent, then the customer’s account is billed/credited the transaction amount, the merchant’s account is billed/credited with the transaction amount, and an acceptance notification is returned to the merchant. If the billing digest values do not match, then no funds are transferred and a denial notification is returned to the merchant. Security is further enhanced by utilizing a unique reference for each transaction in the unique customer information used for creating the billing digest.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
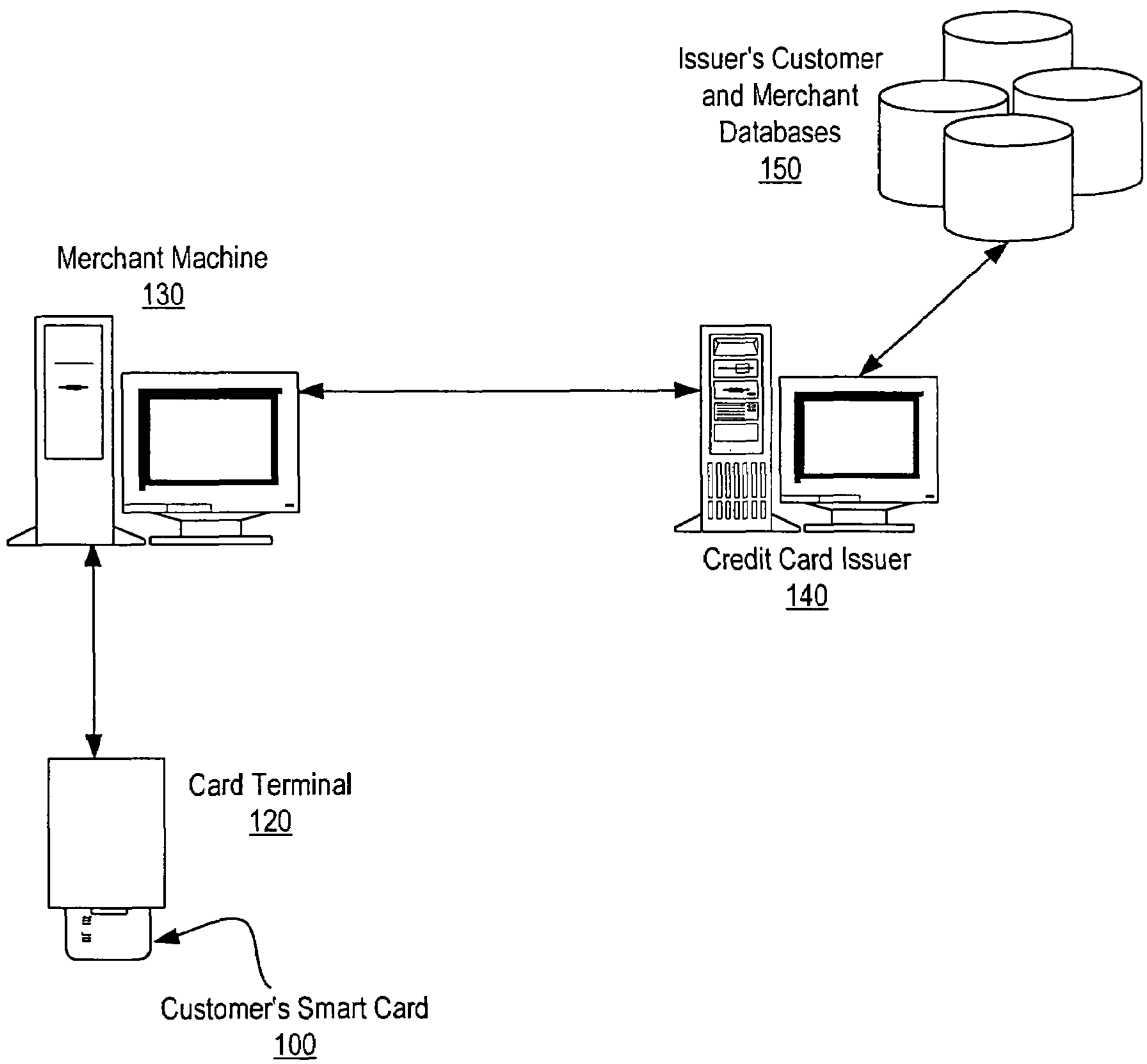
FIG. 1 is a diagram depicting the elements and connections between those elements as used in a commercial credit card transaction as may be employed in a preferred embodiment of the present invention.

With reference to FIG. 1, a diagram depicting a commercial credit card transaction, as may be employed in a preferred embodiment of the present invention. Customers' Smart Card 100 is read by card terminal 120 facilitating communication with merchant's system 130. Smart card 100 is a conventional smart card known in the industry. An example of such a card is the Cryptoflex card series, which utilizes DES, Triple-DES, and RSA algorithms, available from Schlumberger Ltd., 277 Park Avenue New York, N.Y. 10172. In accordance with a prior art commercial transaction, card terminal 120 reads the customer credit card account information and passes that information to merchant system 130. Card terminal 120 may be any commercially available terminal, such as the MagIC Range series of terminals available and trademarked by Schlumberger Ltd. Merchant system 130 then combines the customer account information with merchant transaction information (including time and date of the purchase, purchase amount, summary of the purchased items, the merchant's identification number, the credit card number and the identity of the credit card issuer). Merchant's system 130 then transmits customer's credit card account information with the merchant transaction information to credit card issuer's system 140. The transaction information sent to the credit card issuer may or may not be conveyed over a secure transmission. If the transmission means is not secure, both the customer account information and the transaction information may be compromised. With the recent proliferation of e-commerce transactions over the Internet, security is a prime concern for the customer, merchant and credit card issuer. In the prior art business transaction model, an unauthorized user can conduct e-commerce transactions with no more information than a customer's credit card number and expiration date.

Credit card issuer's system 140 accesses customer and merchant databases 150 for customer and merchant information. Customer information comprises information about individual customers including account number, name, etc. while the merchant information comprises information about individual merchants including identification number, name, etc. in addition to transaction type, amount, time/date, etc. The combination of customer and merchant information will be referred to as transaction information and will be discussed in greater detail below.

The credit card issuer evaluates such criteria as customer account limits, current customer account balance, transaction type, customer account type and merchant account validity prior to approving the transaction between the merchant and the customer. If the transaction would not violate any credit card issuer parameters, based on the current customer account criteria, then the transaction is approved. Once approved, the customer's account is debited/credited by the transaction amount. Simultaneously, the merchant's account is credited/debited by an amount equal to the transaction amount. A transaction confirmation is then sent from the credit card issuer's system 140 to merchant's system 130, along with the new account balances for both the merchant's account and the customer's account. Upon receiving confirmation from the credit card issuer, the merchant usually prints out hard copies for itself and the customer, and then transmits the customer account balance information to card terminal 120. From there, the account balance information stored on customer's smart card 100 is updated to reflect the transaction.

Hughes and McCown disclose an encryption key management technique in U.S. patent application Ser. No. 09/443,963, entitled "ENCRYPTION KEY MANAGEMENT SYSTEM USING MULTIPLE SMART CARDS", filed on Nov. 19, 1999. That application is incorporated by reference in it entirety.

Figure 2:
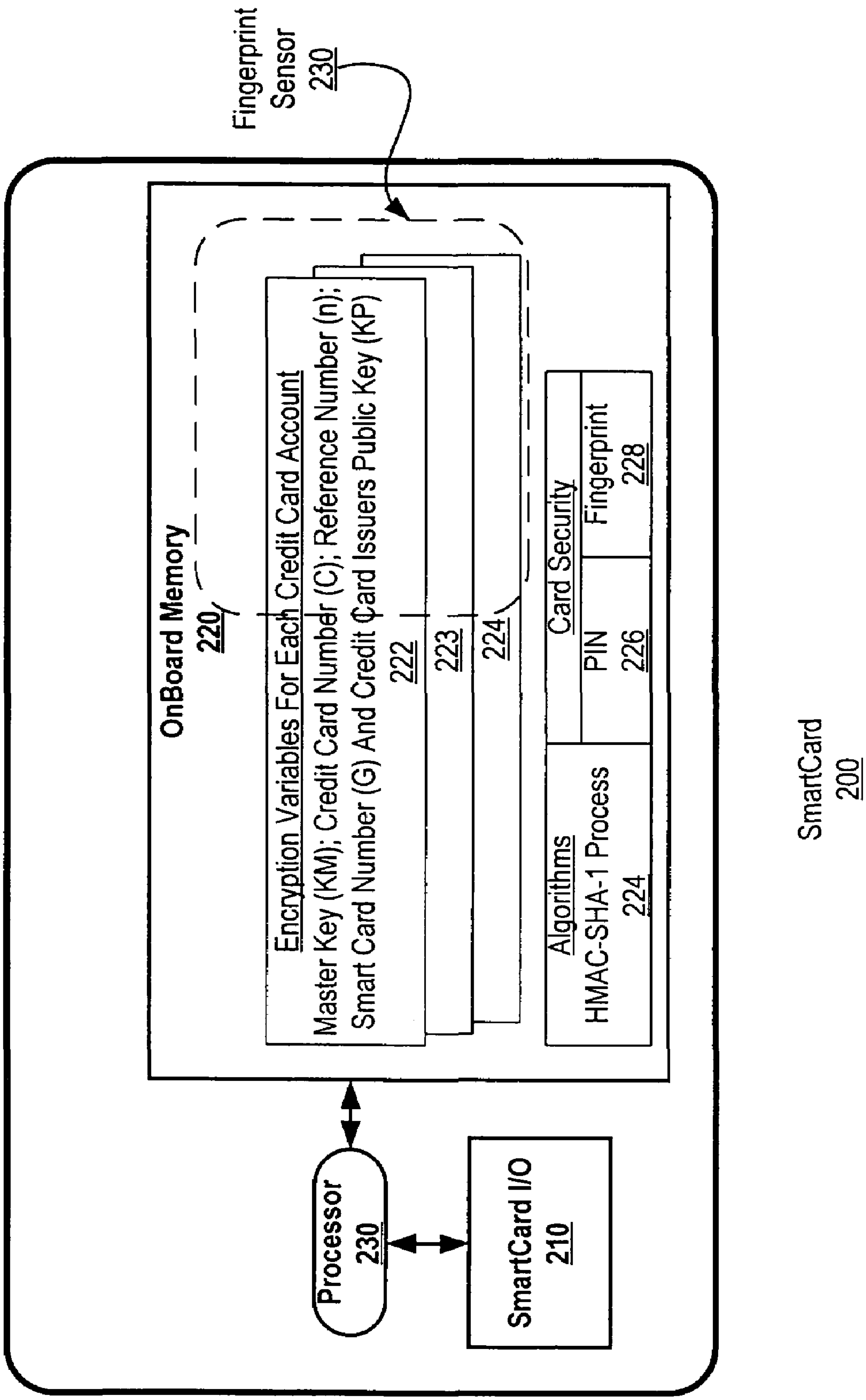
FIG. 2 is a diagram depicting the function elements of a smart card in accordance with a preferred embodiment of the present invention.

With reference to FIG. 2, a diagram depicting the function elements of a smart card in accordance with a preferred embodiment of the present invention, smart card 200 has three basic elements: smart card I/O 210 for communicating with a smart card terminal, onboard memory 220 and processor 230 for processing information from smart card I/O 210 and onboard memory 220. Smart card 200 may be any credit card containing memory and a microprocessor which conforms to the ISO 7816, ISO 14443, or similar series of standards. Onboard memory 220 contains both data and executable routines and algorithms necessary for conducting commercial transactions. One such routine is a card security pin routine 226 used for preventing unauthorized possessors of smart card 200 from conducting commercial transactions. Card security pin routine 226 is a security layer which prompts the possessor of smart card 200 for a pin number prior to making the functionality of smart card 200 available to the user. Once the smart card possessor enters a correct pin number, via a smart card terminal, the possessor has access to all data and functionality available on smart card 200. Another security routine available on smart card 200 is one or more hashing algorithms. These algorithms include HMAC (Hashing based Message Authentication Codes), which is a mechanism for message authentication using cryptographic hash functions. HMAC can be used with any iterative cryptographic hash function, e.g., SHA-1, in combination with a secret shared key. The Secure Hash Algorithm (SHA), the algorithm specified in the Secure Hash Standard (SHS, FIPS PUB 180-1: Secure Hash Standard, April 1995), was developed by NIST. Here the HMAC-SHA-1 algorithms may be self executing applications or applets, or may merely be accessed by an application in response to a new billing digest request, GetNextDigest( ).

A digest is the binary result of a hashing function, such as the HMAC-SHA-1 algorithm. A digest is computed by inputting a piece of data into a hashing function. Only hashes of equal inputs generate equal digests. Digests may be used to determine the authenticity of data from one instance to another. The billing digest returned in response to a new billing digest request is merely a digest generated from specific transaction information such as: transaction type, amount, time/date, merchant name, merchant identification number, customer account number, customer name. This value is generated on the customer's smart card. With each request for a billing digest, a new 160-bit billing digest and a corresponding variable N are returned to the merchant (this process will be discussed in detail below with respect to the flowcharts). While the term "billing digest" is used herein, as a practical matter a billing digest will be requested for any customer transaction such as credit card charged purchases, account debited purchases, refunds and other customer transactions.

In accordance with a preferred embodiment of the present invention, smart card 200 utilizes encryption variables for credit card account 222 in the HMAC-SHA-1 process. Encryption variables for credit card account 222 are but one of a plurality of sets of encryption variables for separate credit card accounts 223 and 224. Encryption variable for each credit card account 222, include a master key (KM), smart card number (G), credit card number (C) and a reference number (n), which is incremented at each transaction. KM, C and n are instantiated from the issuer of the credit card account. Additionally, other encryption variables for a credit card account may include the credit card account issuers public key (KP). Smart card 200 four encryption variables 222 comprise:

1. A 256-bit Master Key (KM) that is set by the credit car issuer when the smart card is first initialized;
2. A 16-byte key credit card number (C) that is set by the credit card issuer when the smart card is first initialized;
3. A 5-byte reference number (n; initially set to 0) corresponding to each of the billing digests that it has generated (i.e., via a call to GetNextDigest( )); and
4. A 32-bit smart card identifier number (G) which describes the smart card to which the master key has been issued, alternatively, G may be a group number describing a set of smart cards using the same master key (KM) and credit card number (C).

The length of the values presented herein are representative of a preferred embodiment of the present invention, but in practice may consist of any bit length. The master key is generated by an off-board application for the sole purpose of creating these cards and then destroyed. A one-time key is used for generating KM and destroyed. The KM is written to encryption smart card 200 when the smart card is initiated. KM must remain a secret because the key generation processes relies on three primary components: the range number (N), which may be found, unencrypted, in the transmitted information; the public domain hashing algorithms; and KM. Of the three, KM is the only secret component which will not be transmitted.

With respect to encryption variables 222, smart card number (G) is issued to the card or cards with the same KM. G can be any length, but a 4-byte value has been implemented. Credit card number (C) is a unique credit card account designation, which is assigned to each credit card customer, or group of customers sharing the same account. C can be any length, but it is currently implemented as a 16-byte value. Each encryption smart card 200 implements a key range variable (N), which is a concatenation of the card group (G), the individual card number (C), and the reference number (n) (of the form 0xGGGGCCCCCCCCCCCCCCCCCnnnnn). For example, key card #1 would have the range 0x00001234567890123456000000–0x00001234567890123456FFFFF and key card #2 would have the range 0x00011234567890123456000000–0x00014-1234567890123456FFFFF.

Once initialized, C, G, and KM cannot be changed. After the customer's smart card generates each billing key (described in detail below), n is incremented by one. When n reaches the boundary of the reference values (e.g., 0XFFFFF), encryption smart card 200 can no longer be used for key generation. Up to 4096 key generation cards may be created for a given KM and each card generates a unique set of keys.

Figure 3A:
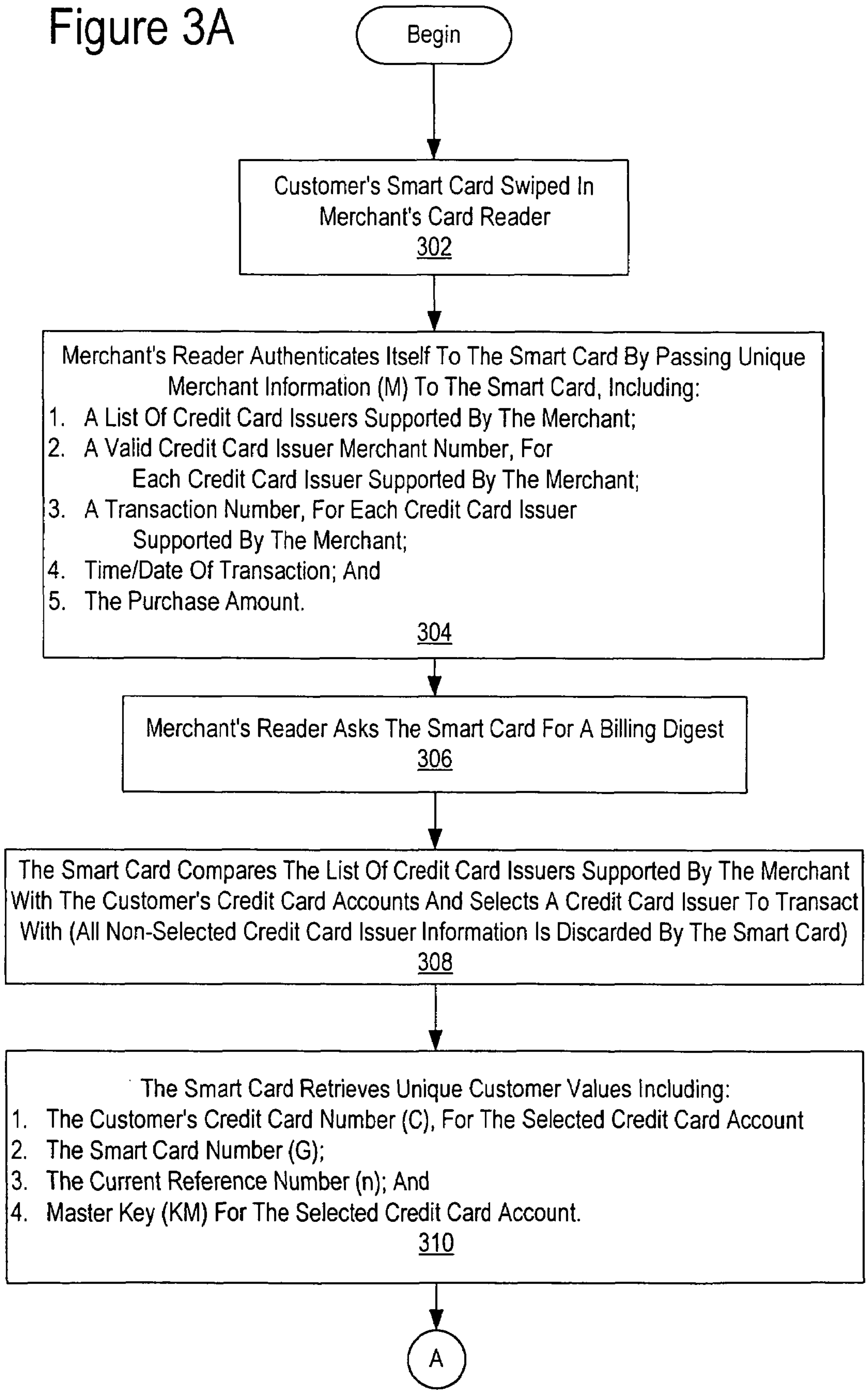
FIGS. 3A and 3B are flowcharts depicting a process for creating a billing digest for conducting a secure credit card transaction in accordance with a preferred embodiment of the present invention.
Figure 3B:
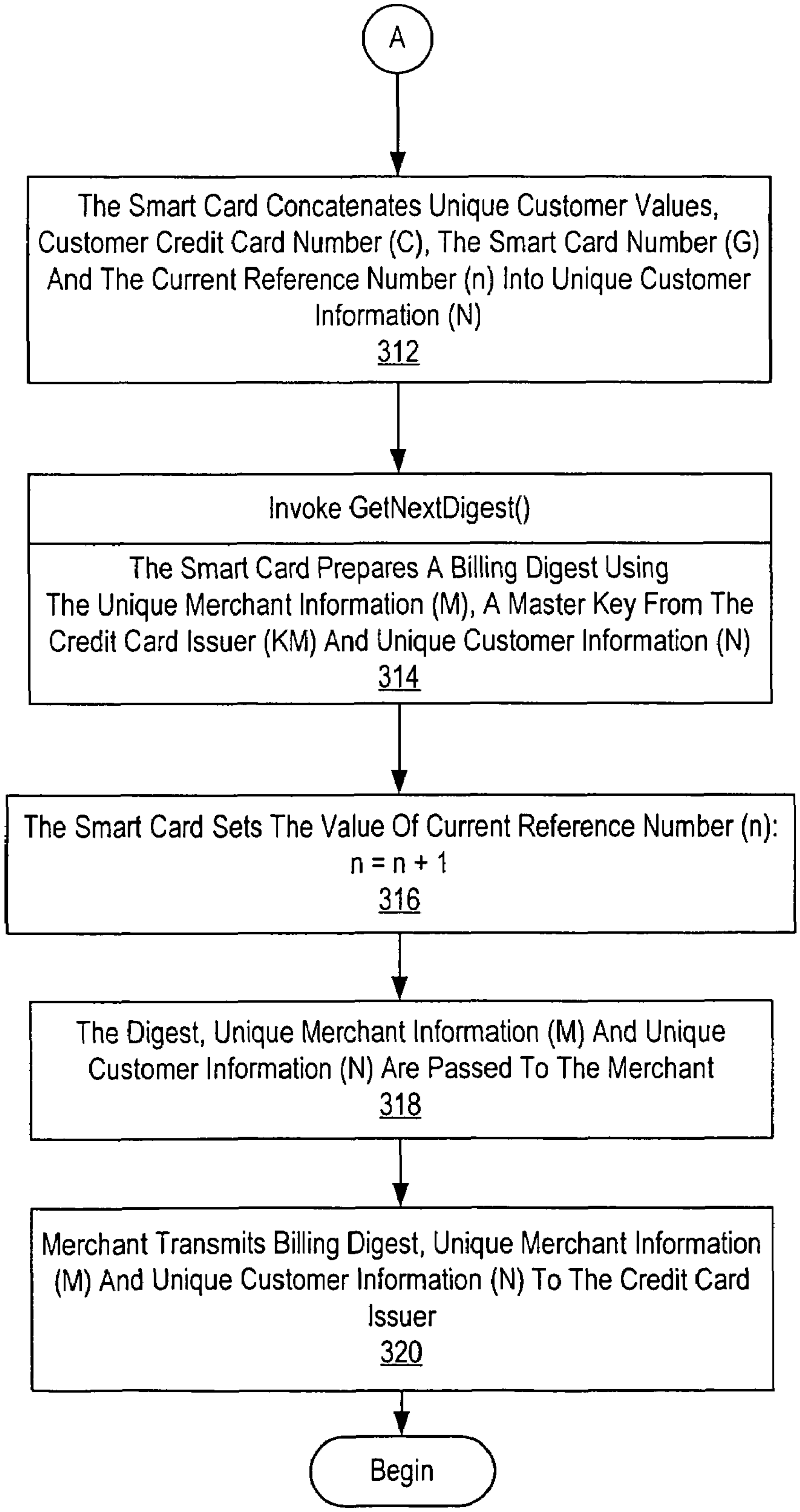

In reference to FIGS. 3A and 3B, a flowchart depicting a process for creating a billing digest for conducting a secure credit card transaction in accordance with a preferred embodiment of the present invention. The process begins with a customer's card being swiped in a merchant's card terminal (step 302). In practical application, the customer's smart card will actually be inserted in a smart card terminal during the transaction. The interface may provide the user with a keypad for entering a personal identification number (PIN) or password. Alternatively or in addition, the smart card itself may require a biometric input such as a fingerprint from the customer prior to authorizing the customer to use the functionality of the smart cart. Regardless of the type of interface, once a smart card is read, the merchant's card terminal authenticates itself to the customer's smart card by passing unique merchant information (M) to the customer's smart card (step 304). The unique merchant information may include data such as a list of credit card issuers supported by the merchant, a valid credit card issuer merchant number for each credit card supported by the merchant, the transaction number, which is specific for each credit card issuer supported by the merchant, the time/date of the transaction, the purchase amount and the identification of the product or service. Depending on the transaction type, security level or other transaction factors, the unique merchant information (M) may include other merchant data with which to authorize the merchant's card terminal to the customer's smart card. Next, the merchant's card terminal asks the customer's smart card for a billing digest (step 306).

The customer's smart card receives the unique merchant information (M) and the request for a billing digest, and compares the list of credit card issuers supported by the merchant with a list of credit card accounts resident on the smart card. The customer's smart card selects a credit card issuer to transact with either by matching the merchant's list with the customer's accounts or utilizing a preset credit card account selection variable or manual input by the customer to the card terminal interface (step 308). Once a credit card issuer has been selected, the customer's smart card discards all data concerning other credit card issuers passed by the merchant. Once a credit card account has been selected, the smart card retrieves unique customer card values from the smart card memory (step 310). The unique customer values include such variables as the customer credit card number (C) for the selected credit card account, smart card number (G), a recurrent reference number (n) and a master key (KM) for the selected credit card account. The customer credit card number (C) and the master key (KM) are provided to the customer's smart card by the credit card issuer at the time the card was issued or renewed. Additionally, the credit card issuer provides a range of reference numbers from which reference number (n) is iterated at each transaction.

Once the customer's smart card has received the unique merchant information and retrieved the unique customer values, the customer's smart card concatenates the unique customer's values of customer credit card number (C), smart card number (G) and the current referenced number (n) into a unique customer number (N) (step 312).

$$N=CGn$$

Once a unique customer number (N) has been concatenated, the function GetNextDigest( ) is called. Using GetNextDigest( ), the customer's smart card prepares a billing digest using the unique merchant information (M), the master key (KM) from the credit card issuer and the unique customer information (N) (step 314). Smart card then increments the value of the current reference number (n) (step 316).

$$n=n+1$$

The customer's encryption smart card can issue a maximum number of billing digests equal to the maximum value of n (reference number). However, n is an incremental value that may be initialized at any value less than its maximum value. Therefore, the actual number of encryption keys generated by a particular card may vary from one key to the maximum value of n number of billing digest, depending on the initial value which n was set. Multiple cards using the same credit card account number may be identified by the unique smart card number (G) involved in the transactions. In another embodiment, reference range value might be set from 000–199 on one smart card for a particular account, while another card drawn to the same account might have reference range values set from 500–699. By setting unique ranges for individual smart cards under the same credit card account, credit card issuer is able to identify the unique smart card it is transaction with.

The billing digest, the unique merchant information (M) and the unique customer information (N) are then passed to the merchant (step 318). The merchant in turn transmits the billing digest, the unique merchant information (M) and the unique customer information (N) (the billing digest and transaction information) to the credit card issuer (step 320).

Figure 4A:
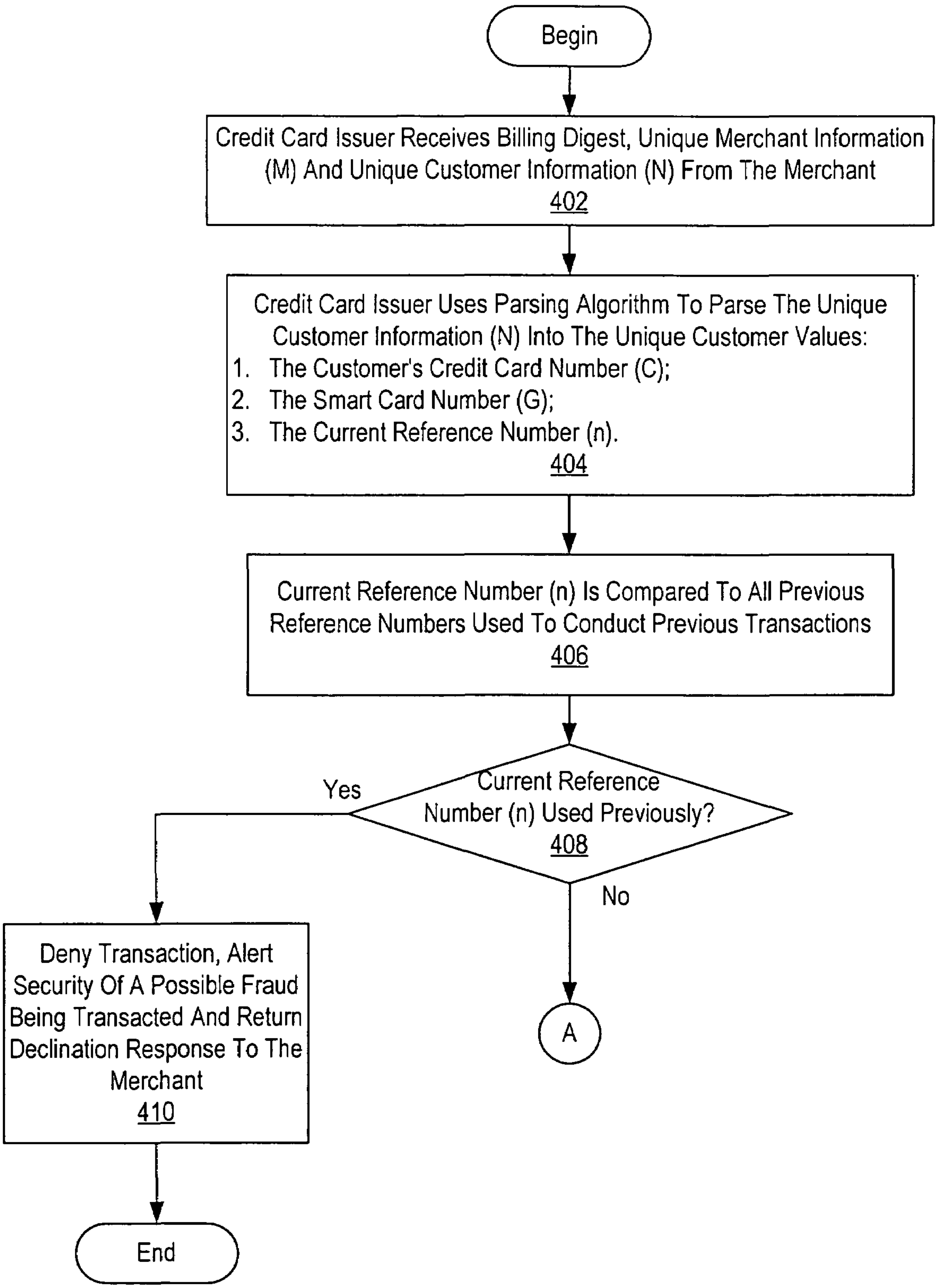
FIGS. 4A and 4B are flowcharts depicting a process for responding to a secure transaction, which includes a billing digest in accordance with a preferred embodiment of the present invention.
Figure 4B:
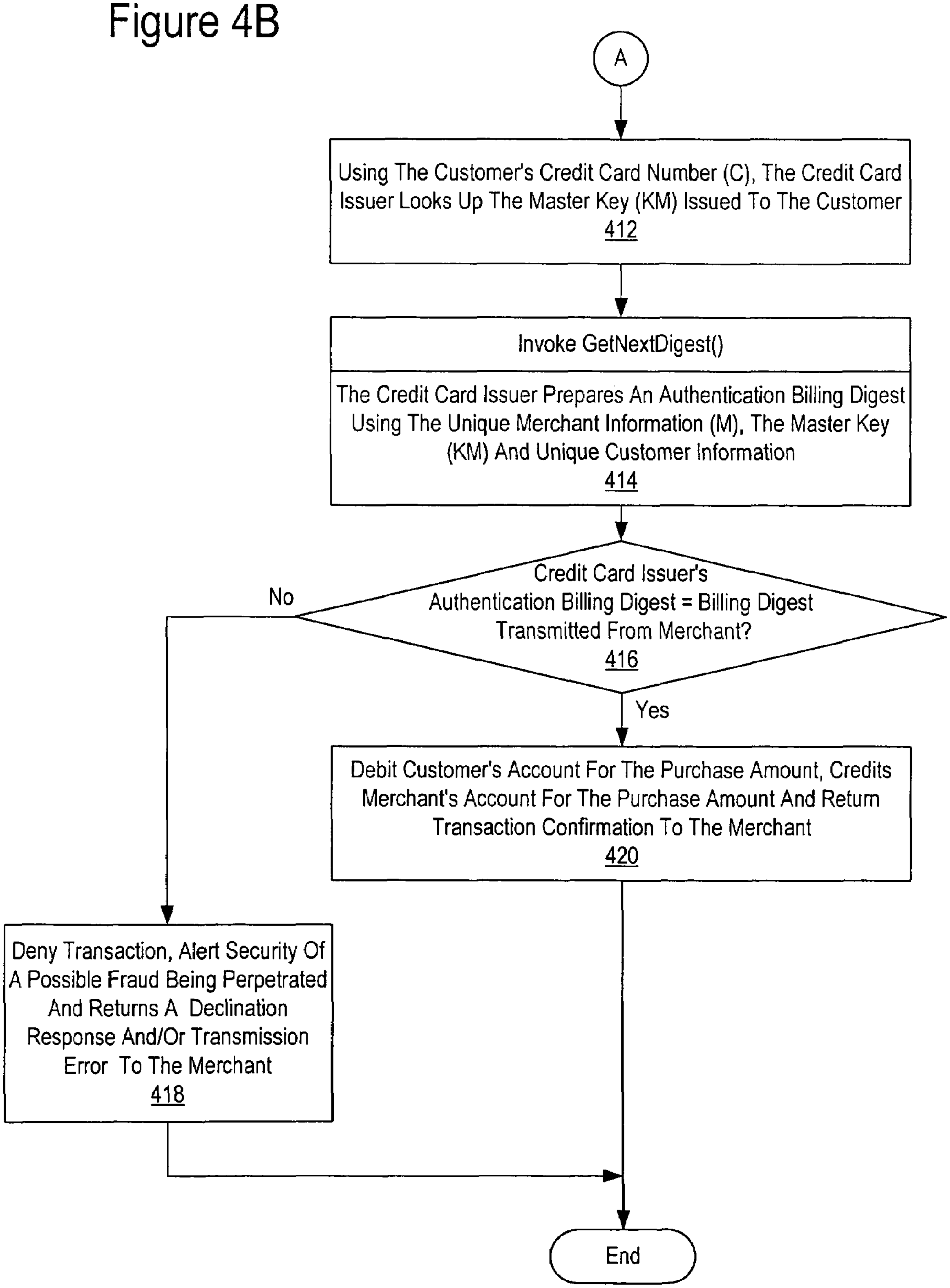

With reference FIGS. 4A and 4B, a flowchart depicting a process for responding to a secure transaction, which includes a billing digest, in accordance with a preferred embodiment of the present invention. The process begins with the credit card issuer receiving the secure credit card transaction from the merchant (step 402). A secured credit card transaction includes the billing digest and transaction information (unique merchant information (M) and the unique customer information (N)), which was transmitted by the merchant. The credit card issuer uses a parsing credit card algorithm to parse the unique customer information (N) into the separate unique customer values of the credit card number (C), smart card number (G) and the current reference number (n)(step 404). Next, the credit card issuer performs a security check on the transaction by comparing the current reference number (n) to all previous reference numbers used to conduct previous credit card transactions with the customer (step 406). All previous reference number values are stored in a database associated with the customer's credit card number (C). The check is then made to determine whether the current reference number had been previously used (step 408). If the credit card number had been previously used, the credit card issuer denies the transaction, alerts its internal security of the possibility of a fraud being perpetrated, and then returns a declination response to the merchant (step 410). The process of responding to a secure transaction ends without completing the transaction.

Returning to step 408, if the credit card issuer determines that the current reference number (n) has not been previously used, the credit card issuer looks up the master key (KM) using the customer's credit card number (C) (step 412). With the master key (KM) and the unique customer values, the credit card issuer then invokes GetNextDigest( ). The GetNextKey( ) digest function is a hashing algorithm of which are well known in the art. With the GetNextDigest( ) function, the credit card issuer prepares an authentication billing digest using unique merchant information (M), the master key (KM) and unique customer information (step 414). The authentication billing digest is exactly the same as the billing digest, with the exception that it is generated by the credit card issuer and not in the customer's smart card. The credit card issuer then compares the authentication billing digest with the billing digest transmitted from the merchant (step 416). If the authentication billing digest does not match the billing digest transmitted from the merchant, either an error has occurred during the transmission from the merchant or a fraud is being perpetrated. The credit card issuer then denies the transaction, alerts its internal security of the possibility of a fraud being perpetrated and returns a declination response and/or transmission error to the merchant (step 418). The transaction between the merchant and the credit card issuer then ends.

Returning to step 416, if the authentication billing digest generated by the credit card issuer exactly matches the billing digest transmitted from the merchant, the transaction can be completed. In that case, credit card issuer debits/credits the customer's account for the transaction amount, credits/debits the merchant's account for the transaction amount and returns a transaction confirmation to the merchant (step 420). The process is then complete with respect to responding to a secure transaction.

Of course, at this point, the customer will perform the obligatory signing of the credit card receipt and the transaction information may be written onto the memory of the customer's smart card. The transaction is complete with the customer retrieving the smart card.

Figure 5:
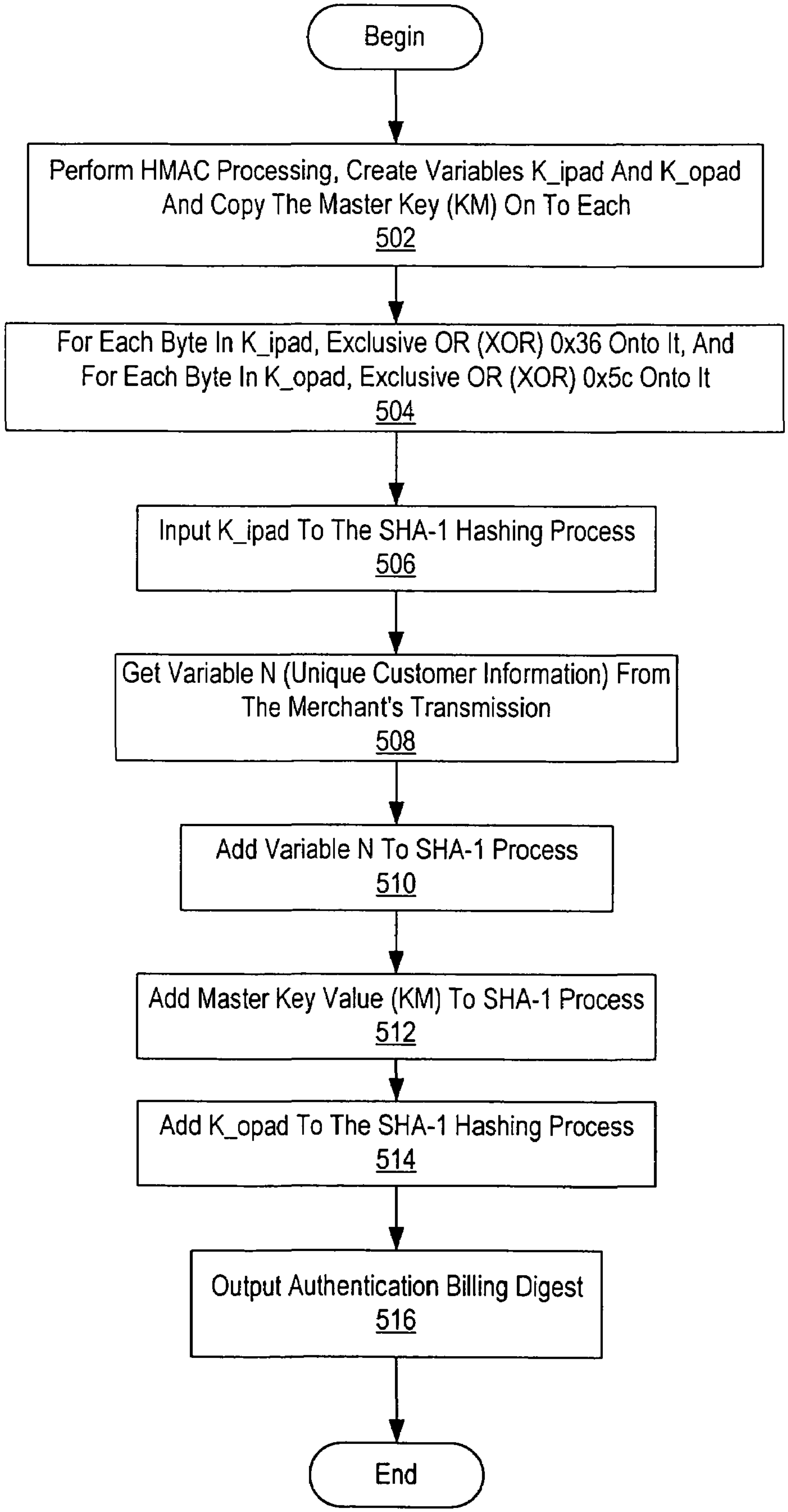
FIG. 5 is a flowchart depicting the processes for invoking the GetNextDigest( ) function for creating the billing digest.

With reference to FIG. 5, a flowchart depicting the process for invoking the GetNextDigest( ) function for creating billing digest, calling the GetNextDigest( ) function invokes a hashing algorithm. One of ordinary skill in the art would be familiar with a multitude of hashing algorithms either proprietary algorithms or algorithms in the public domain. The present invention will be described with respect to the HMAC-SHA-1 algorithm, which is intended as an example only and not meant to limit the scope of the invention. The GetNextDigest( ) process begins with HMAC processing. Variables K_ipad and K_opad are created and a copy of the master key (KM) is copied on each (step 502). For each byte in K_ipad, exclusive OR (XOR)

0X36 onto it. Similarly, for each byte in K_opad, exclusive OR (XOR) 0x5c onto it (step 504). Next, K_ipad is input into the SHA-1 hashing process (step 506). The unique customer information (N) is retrieved from the transaction message (step 508). The variable (N) is then added to the SHA-1 process (step 510). The master key value (KM) is then added to the SHA-1 process (step 512), and finally K_opad is added to the shay-1 hashing process (step 514). The authentication billing digest is an output (step 516). The process is now complete for invoking the GetNextDigest( ) function for creating billing digest.

The above-described flowcharts disclose a secure credit card keying process in accordance with a preferred embodiment of the present invention. Creating a billing digest to accompany merchant and customer information secures the transaction process from unauthorized persons attempting to gain access to the customer's credit card number. In fact, customer, merchant and credit card information is commonly transmitted unencrypted. Therefore, customer profilers may conspire with the merchant to track all transactions occurring in the merchant's place of business. Even though the above-described processes greatly reduce the possibility of an unauthorized person conducting a transaction with a customer's credit card number, the customer and transaction information is still available to a customer profiling agency via the merchant. In accordance with another preferred embodiment of the present invention, the above-described processes are modified by encrypting all pertinent information prior to passing information to the merchant. In so doing, the customer has complete anonymity from tracking or profiling. This functionality is added to the customer's smart card.

Figure 6A:
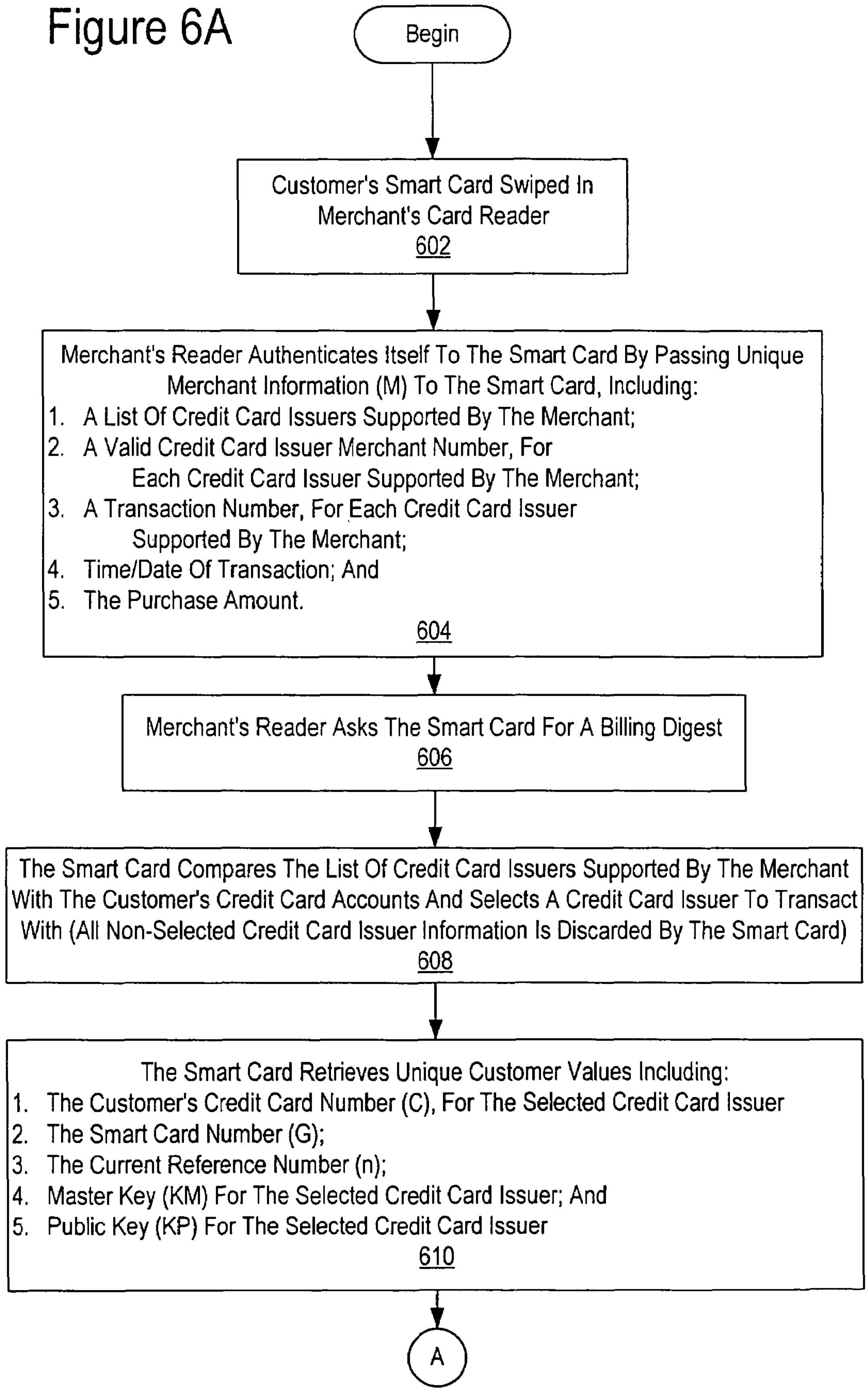
FIGS. 6A and 6B are flowcharts depicting a process for creating a billing digest for conducting a secure credit card transaction, which cannot be tracked by a profiling agency in accordance with a preferred embodiment of the present invention.
Figure 6B:
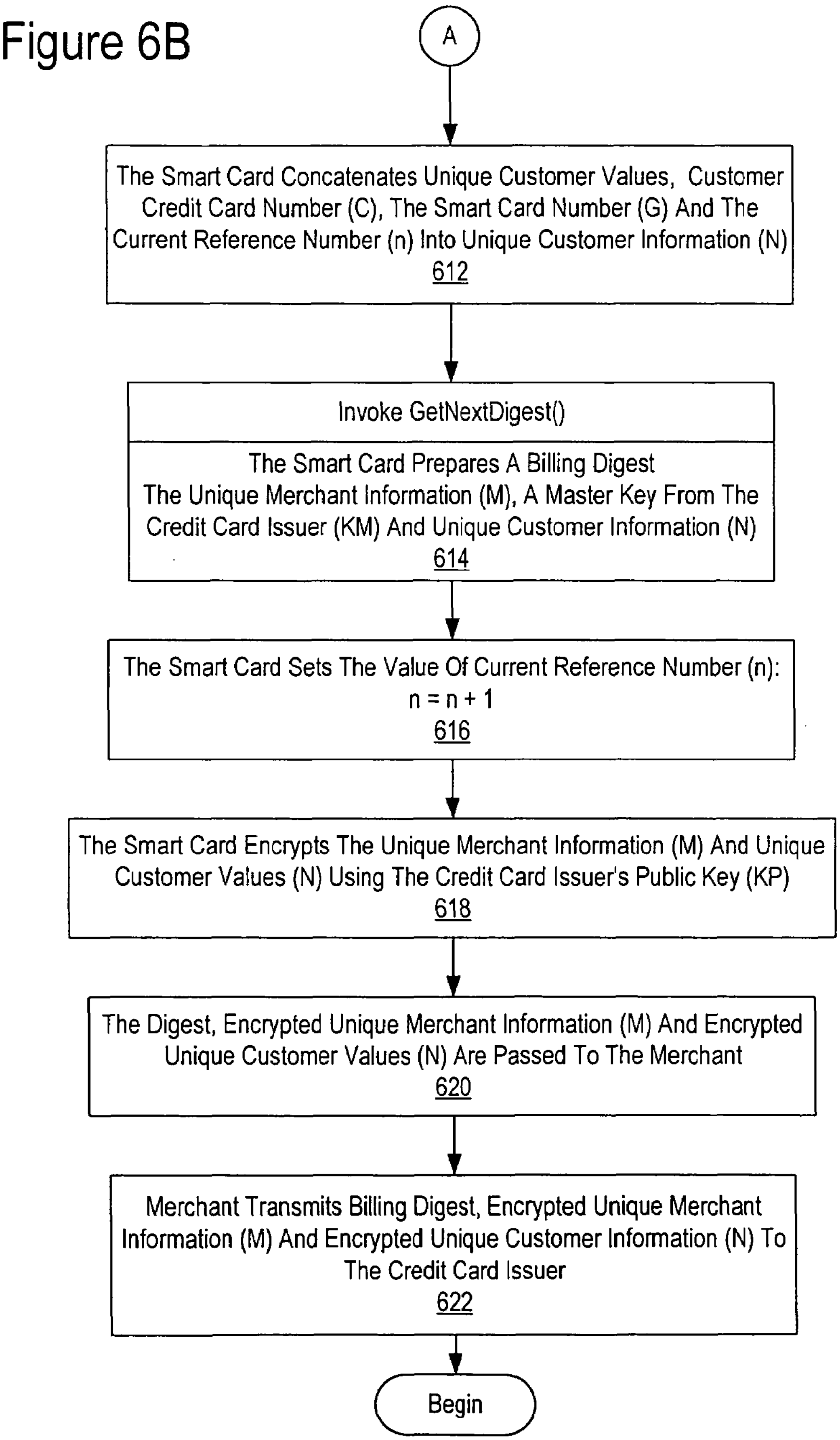

In reference to FIGS. 6A and 6B, a flowchart depicting a process for creating a billing digest for conducting a secure credit card transaction which cannot be tracked by a profiling agency in accordance with a preferred embodiment of the present invention. The process depicted in FIGS. 6A and 6B is similar with the process described above with respect to FIGS. 3A and 3B. Therefore, only the differences in the processes will be discussed in detail. The process begins with customer's smart card being swiped in the merchant's card terminal (step 602). The merchant's card terminal authenticates itself to the customer's smart card by passing unique customer information (M) to the smart card (step 604). As discussed above, the unique merchant information (M) may include a list of credit card issuers supported by the merchant, a valid credit card issuer's merchant number for each credit card issuer supported by the merchant, the time/date of the transaction and the transaction amount. The merchant's card terminal then asks the customer's smart card for a billing digest (step 606). The smart card then compares the list of credit card issuers supported by the merchant with the customer's credit card accounts and selects a credit card issuer to transact it (step 608). The customer's smart card will utilize only the information with respect to the selected credit card issuer. Smart card then retrieves unique customer values from its memory (step 610). Unique customer values include customer credit card number (C), customer smart card number (G) and current reference number (n), the master key (KM) for the selected credit card issuer. In contrast to the previously described embodiment, the smart card also retrieves a public key (KP) for the selected credit card issuer. Next, the smart card invokes the GetNextDigest( ) function and concatenates the unique customer values into unique customer information (N) (step 612). Smart card then prepares a billing digest using the unique merchant information (M), master key (KM) and the unique customer information (N) (step 614). Smart card then increments the value of the current reference number (n)(step 616).

$$n=n+1$$

Next, the smart card encrypts the unique merchant information (M) and the unique customer values (N) using the credit card issuers public key (KP) (step 618). Once encrypted, all data passed to the merchants will be indecipherable. Smart card then passes the digest along with the encrypted unique merchant information (M) and the encrypted customer values (N) to the merchant (step 620). The merchant then transmits the billing digest, encrypted unique merchant information (M) and the encrypted customer information (N) to the credit card issuer (step 622). The process for creating a billing digest for conducting a secure credit card transaction is now complete.

Figure 7A:
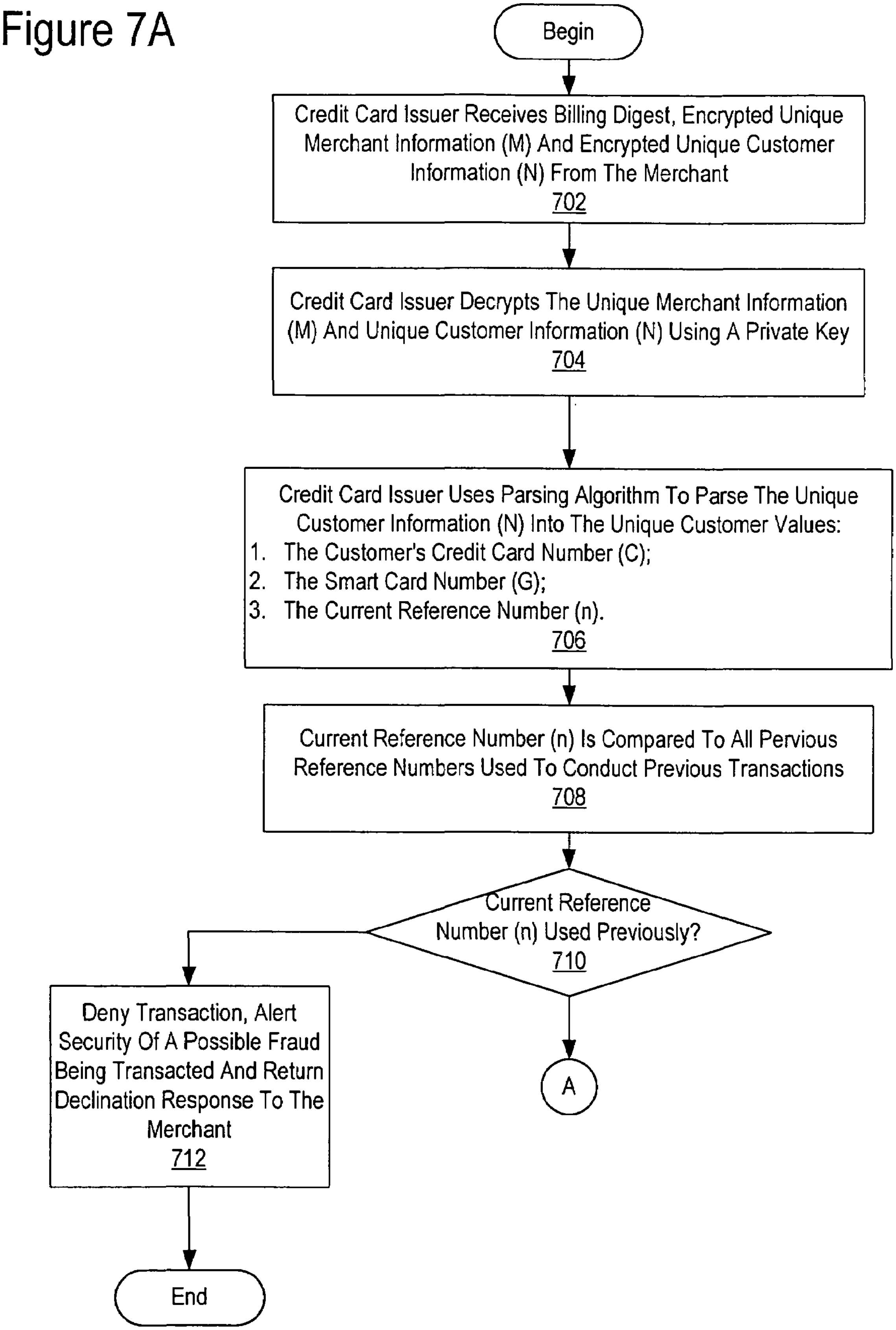
FIGS. 7A and 7B are flowcharts depicting a process for responding to a secure transaction, which includes a billing digest, which cannot be tracked by a profiling agency, in accordance with a preferred embodiment of the present invention.
Figure 7B:
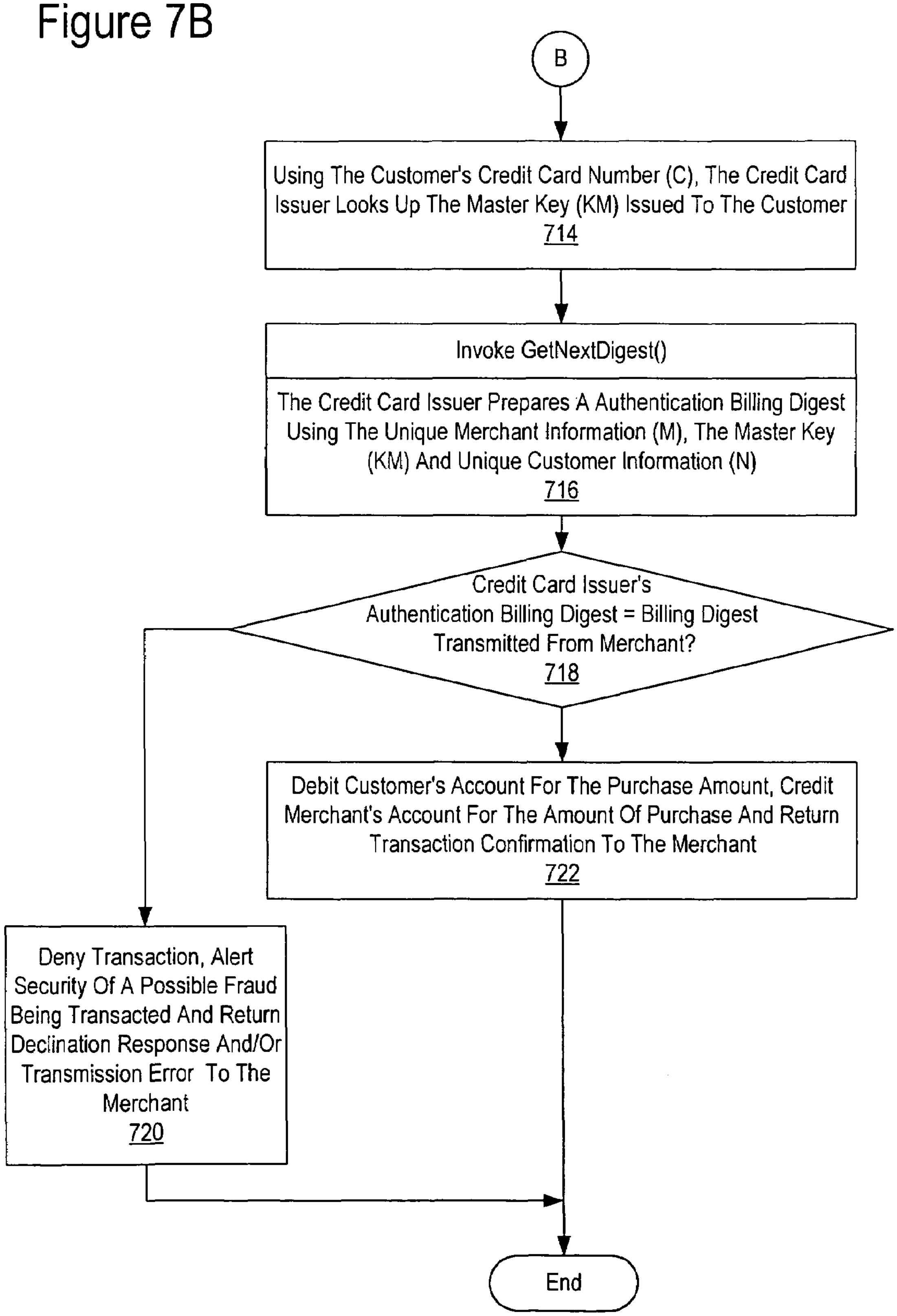

With reference to FIGS. 7A and 7B, a flowchart depicting a process for responding to an secure transaction which includes a billing digest, which cannot be tracked by a profiling agency in accordance with a preferred embodiment of the present invention. The process depicted in FIGS. 7A and 7B is similar in many respects with that described above in 4A and 4B. The only differences in the two processes will be discussed in detail. The process begins with a credit card issuer receiving a billing digest encrypted unique merchant information (M) and encrypted unique customer information (N) from the merchant (step 702). In contrast to the previous embodiment, the credit card issuer must decrypt unique merchant information (M) and unique customer information (N) prior to authenticating the information (step 704). The credit card issuer decrypts the information using a private key. From here the process is identical with that described with respect to FIGS. 4A and 4B. The credit card issuer uses a parsing algorithm to parse the unique customer information (N) back into unique customer values (step 706). The current reference number (n) compared to all previous reference numbers used to conduct prior transactions on the customer's credit card number (C) (step 708). A check is made to determine if the reference number (n) had been previously used (step 710). If the number had been previously used, the transaction is denied, internal security is alerted of the possibility of a fraud being perpetrated and a declination response is sent to the merchant (step 712). The process then ends for that transaction.

Returning to step 710, if the current reference number (n) had not been previously used, the credit card issuer uses customer's credit card number (C) to look up the master key (KM) issued to the customer (step 714). Next, the GetNextDigest( ) is invoked, which prepares an authentication billing digest using the unique merchant information (M), the master key (KM) and the unique customer information (N) (step 716). Next, the credit card issuer checks the authentication billing digest against the billing digest transmitted from the merchant (step 718). If the authentication billing digest does not exactly match the billing digest transmitted from the merchant, the transmission is denied. The credit card issuer alerts its internal security of the possibility of a fraud and returns a declination response and/or transmission error to the merchant (step 720). Returning to step 718, if the authentication billing digest matches exactly the billing digest transmitted from the merchant, the customer's account is debited/credited for the transaction amount and the merchant's account is credited/debited for the transaction amount(step 722). The credit card issuer returns a transaction confirmation to the merchant, it is understood that the confirmation must not contain any of the sensitive information that was previously encrypted in the transmission from the merchant which may identify the customer either by name or by credit card. The process ends.

The description of the present invention has been presented for purposes of illustration and description, and is not intended to be exhaustive or limited to the invention in the form disclosed. Many modifications and variations will be apparent to those of ordinary skill in the art. For example, although the HMAC-SHA-1 hash process is illustrated, other hashing algorithms are common and may be used. Further, while the presently described mechanism of the present invention for encrypting the transmission between the merchant and the credit card issuer is a public/private encryption scheme, other encryption techniques are well known and wide spread in the industry. For example, the credit card issuer may utilize a private/private key encryption scheme. Still another modification of the present invention is for the merchant's machine to utilize the present process for hashing the transaction information. Additionally, the mechanism of the present invention also may be applied to transactions other than commercial credit card transactions. The preferred processes are easily adapted to any transaction in which a smart card is used to transmit sensitive information. Still further the transaction information may include any combination of information types from the customer and merchant with the exception of some private information, the master key, know only to the customer and the credit card issuer. However, the transaction information must provide the credit card issuer with a customer identifier for looking up the customer's account and master key, and, of course, a merchant identifier to look up the merchant's account. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for securing a transaction in order to prevent fraudulent transactions, said method comprising:

receiving prior to the transaction a secret master key from a third party, wherein the master key remains unchanged and is kept secret, and is not altered after the transaction, the third party storing a copy of the master key;

receiving a request for a digest from a requestor;

retrieving the master key;

retrieving unique client information;

the client information being associated with the master key;

creating the digest by hashing the unique client information and the master key;

returning the digest and the unique client information to the requester, wherein the digest and the unique client information will be used for transacting with the third party;

wherein the request further comprises unique requester information and creating the digest further comprises hashing the unique requester information; and wherein the transaction is a credit card transaction, the third party is a credit card issuer and the requestor is a merchant, further wherein the unique requester information includes information describing a merchant identifier which is specific to the credit card issuer, a transaction identifier which is specific to the credit card issuer and purchase information which is specific to a purchase initiated by the client.

2. The method recited in claim 1 above, wherein the request includes unique merchant information which is used to access the master key.

3. The method recited in claim 1 above, wherein the unique client information includes a reference number, the reference number being one of a plurality of reference numbers provided to the client by the third party.

4. The method recited in claim 1 above, wherein creating the digest by hashing is performed by a smart card.

5. The method recited in claim 1 above further comprises encrypting the unique client information prior to retrieving the unique client information.

6. A method for securing a transaction in order to prevent fraudulent transactions, said method comprising:

receiving, prior to the transaction, a secret master key from a third party, wherein the master key remains unchanged, and is not altered after the transaction, the third party storing a copy of the master key within the third party, the master key being kept secret;

receiving, by the third party, a transaction request from a requestor, wherein the transaction request includes a digest and unique client information, the unique client information being associated with the master key;

accessing the copy of the master key based on the unique client information;

creating an authorization digest by hashing the unique client information and the copy of the master key;

comparing, by the third party, the authorization digest with the digest from the requestor;

returning a response to the requester from the third party, the content of the response being based on an outcome of the comparison of the authorization digest with the digest from the requestor;

wherein the request includes unique requestor information and creating the authorization digest further comprises hashing the unique requestor information; and wherein the third party is a credit card issuer, the transaction is a credit card transaction and the requester is a merchant, further wherein the requestor information includes information describing a merchant identifier which is specific to the credit card issuer, a transaction identifier which is specific to the credit card issuer and purchase information which is specific to a purchase initiated by the client.

7. The method recited in claim 6 above, wherein the unique client information includes a reference number, the reference number being one of a plurality of reference numbers provided to the client by the third party.

8. The method recited in claim 7 above further comprises:

accessing all previously used reference numbers associated with the unique client information;

comparing the previously used reference numbers with the reference number contained in the unique client information; and returning a response to the requester, the content of the response being based on the outcome of the comparison of the previously used reference numbers with the reference number contained in the unique client information.

9. The method recited in claim 6 above, wherein creating the authentication digest by hashing is performed by a smart card.

10. The method recited in claim 6 above further comprises decrypting the unique client information prior accessing the copy of the master key.

11. A system for securing a transaction in order to prevent fraudulent transactions comprising:

receiving means for receiving a secret master key from a third partition prior to the transaction, the master key remaining unchanged after the transaction, the master key being kept secret;

receiving means for receiving a request for a digest from a requester;

retrieving means for retrieving the master key;

retrieving means for retrieving unique client information;

the client information being associated with the master key;

creating means for creating the digest by hashing the unique client information and the master key;

returning means for returning the digest and the unique client information to the requester, wherein the digest and the unique client information will be used for transacting with the third party;

wherein the request further comprises unique requester information and creating the digest further comprises hashing the unique requestor information; and wherein the transaction is a credit card transaction, the third party is a credit card issuer, and the requester is a merchant, further wherein the unique requester information includes information describing a merchant identifier which is specific to the credit card issuer, a transaction identifier which is specific to the credit card issuer and transaction data which is specific to a transaction initiated by the client.

12. The system recited in claim 11 above, wherein the request includes unique merchant information which is used to access the master key.

13. The system recited in claim 11 above, wherein the unique client information includes a reference number, the reference number being one of a plurality of reference numbers provided to the client by the third party.

14. The system recited in claim 11 above, wherein the creating means for creating the digest by bashing is performed by a smart card.

15. The system recited in claim 11 above farther comprises encrypting means for encrypting the unique client information prior to returning the unique client information.

16. The system recited in claim 11 above further comprises:

fingerprint reading and identification means for reading a fingerprint and authorizing a client based on an identity of a client's fingerprint.

17. A system for securing a transaction in order to prevent fraudulent transactions comprising:

providing means for providing from a third party a secret master key to a client, the master key remaining unchanged after the transaction;

receiving means for receiving a transaction request from a requestor, wherein the transaction request includes a digest and unique client information, the digest being created utilizing the master key provided to the client and the unique client information, the unique client information being associated with the master key;

accessing means for accessing, by the third party, a master key stored within the third party based on the unique client information;

creating means for creating an authorization digest by hashing the unique client information and the master key;

comparing means for comparing the authorization digest with the digest from the requester;

returning means for returning a response to the requester, the content of the response being based on the outcome of the comparison of the authorization digest with the digest from the requestor;

wherein the request includes unique requester information and creating the authorization digest further comprises hashing the unique requester information; and wherein the transaction is a credit card transaction, the third party is a credit card issuer and the requester is a merchant, further wherein the requester information includes information describing a merchant identifier which is specific to the credit card issuer, a transaction identifier which is specific to the credit card issuer and transaction data which is specific to a transaction initiated by the client.

18. The system recited in claim 17 above, wherein the unique client information includes a reference number, the reference number being one of a plurality of reference numbers provided to the client by the third party.

19. The system recited in claim 18 above further, comprises:

accessing means for accessing all previously used reference numbers associated with the unique client information;

comparing means for comparing the previously used reference numbers with the reference number contained in the unique client information; and returning means for returning a response to the requester, the content of the response being based on the outcome of the comparison of the previously used reference numbers with the reference number contained in the unique client information.

20. The system recited in claim 17 above, wherein creating the authentication digest by hashing is performed by a smart card.

21. The system recited in claim 17 above further comprises decrypting the unique client information prior accessing the copy of the master key.

22. A computer program product for securing a transaction in order to prevent fraudulent transactions embodied on a computer readable medium comprising:

providing instructions for providing from a third party a secret master key, the master key remaining unchanged after the transaction;

receiving instructions for receiving a request for a digest from a requester;

retrieving instructions for retrieving the master key;

retrieving instructions for retrieving unique client information;

the master key being associated with the client information;

creating instructions for creating the digest by hashing the unique client information and the master key;

returning instructions for returning the digest and the unique client information to the requester, wherein the digest and the unique client information will be used for transacting with the third party;

wherein the request includes unique requester information and creating the authorization digest further comprises hashing the unique requester information; and wherein the transaction is a credit card transaction, the third party is a credit card issuer and the requester is a merchant, further wherein the requester information includes information describing a merchant identifier which is specific to the credit card issuer, a transaction identifier which is specific to the credit card issuer and transaction data which is specific to a transaction initiated by the client.

23. The method recited in claim 22 above, wherein the request includes unique merchant information which is used to access the master key.

24. The method recited in claim 22 above, wherein the unique client information includes a reference number, the reference number being one of a plurality of reference numbers provided to the client by the third party.

25. The method recited in claim 22 above, wherein creating the digest by hashing is performed by a smart card.

26. The method recited in claim 22 above further comprises encrypting the unique client information prior to retrieving the unique client information.

27. The system recited in claim 22 above further comprises:

fingerprint reading and identification means for reading a fingerprint and authorizing a client based on an identity of a client's fingerprint.

* * * * *